No. 663,442. Patented Dec. 11, 1900.
M. C. JOHNSON.
VARIABLE SPEED GEARING.
(Application filed June 4, 1900.)
(No Model.) 3 Sheets—Sheet 2.
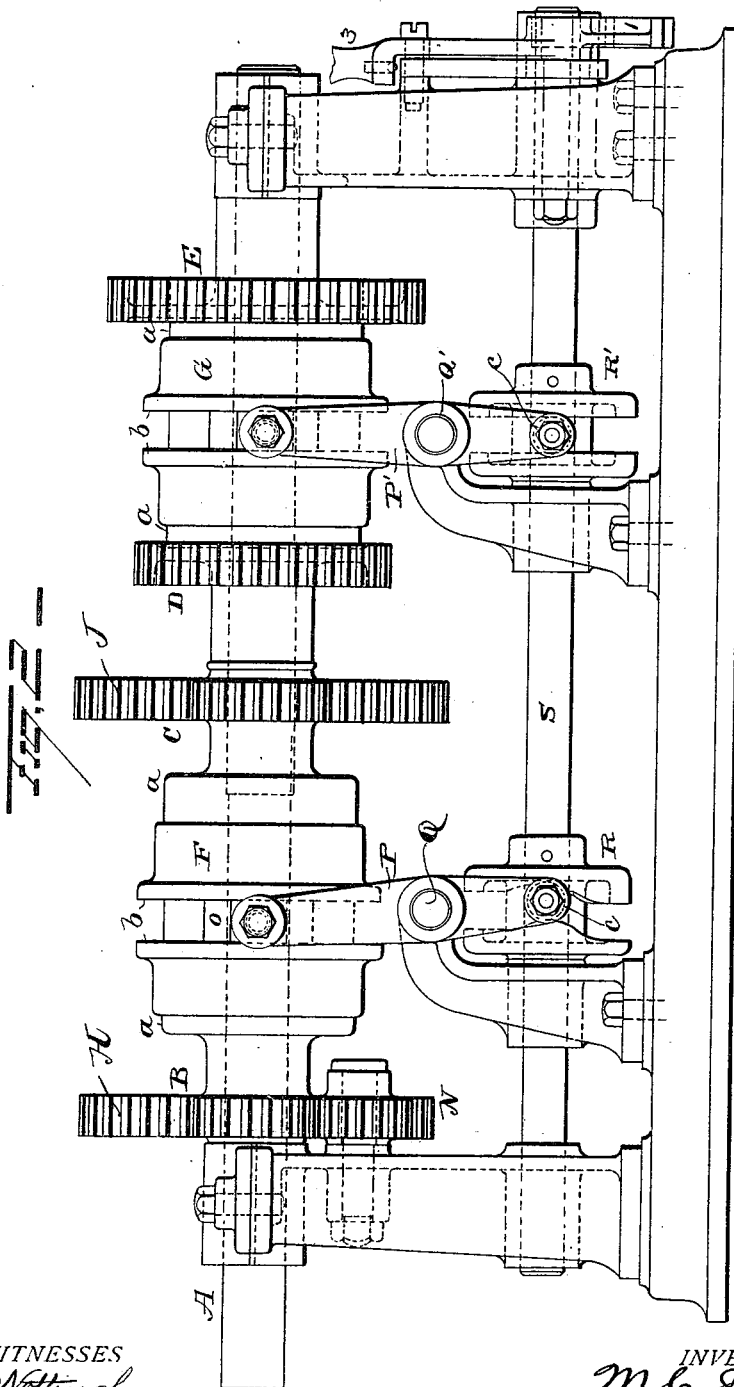
WITNESSES
E. J. Nottingham
G. F. Downing
INVENTOR
M. C. Johnson
By H. A. Seymour
Attorney No. 663,442. Patented Dec. 11, 1900.
M. C. JOHNSON.
VARIABLE SPEED GEARING.
(Application filed June 4, 1900.)
(No Model.) 3 Sheets—Sheet 3.
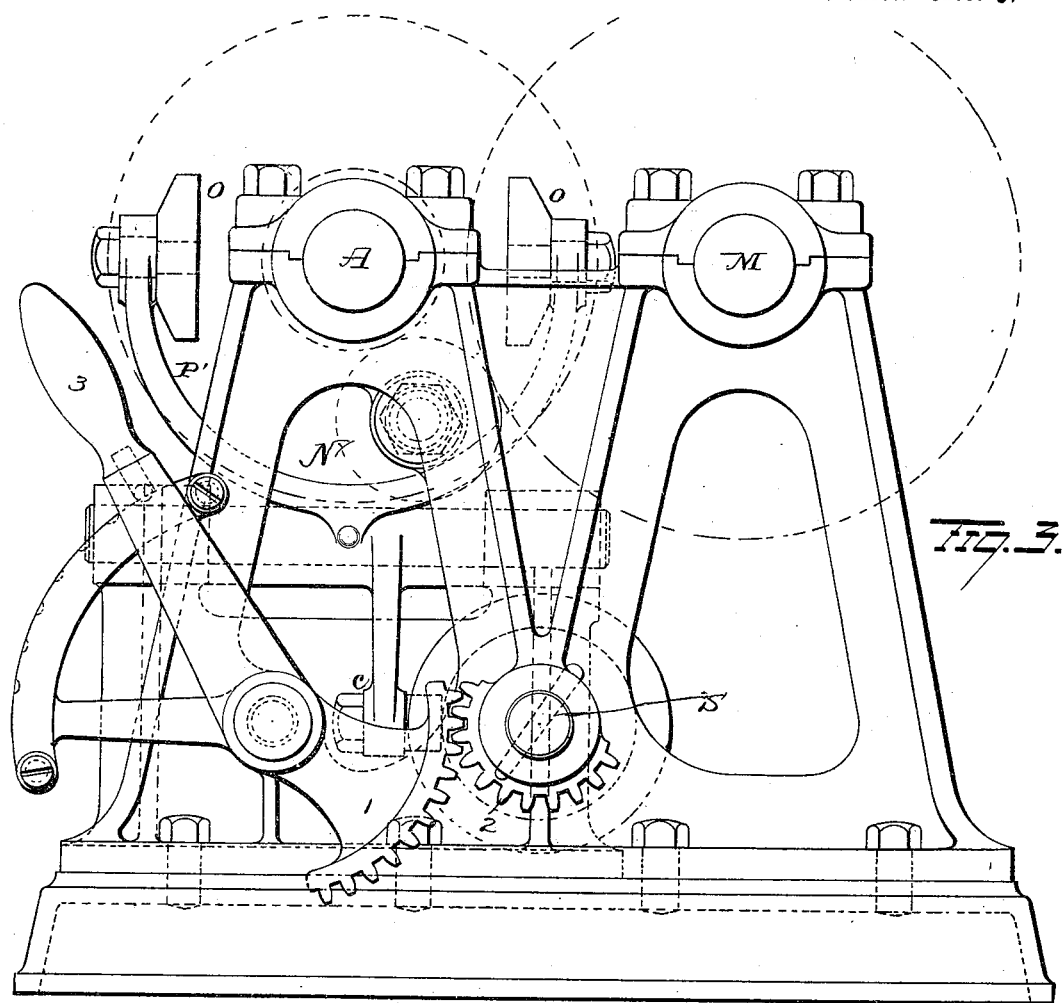
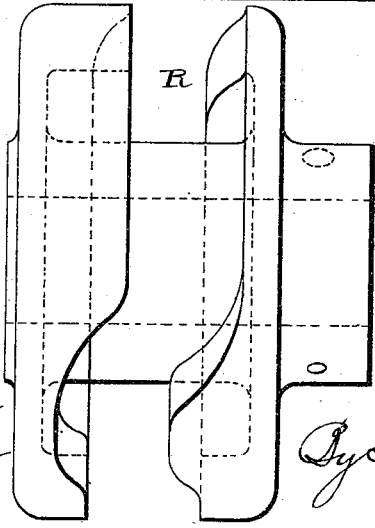
WITNESSES
INVENTOR
M. C. Johnson
Attorney
THE NORRIS PETERS CO., PHOTO-LITHO., WASHINGTON, D. C.

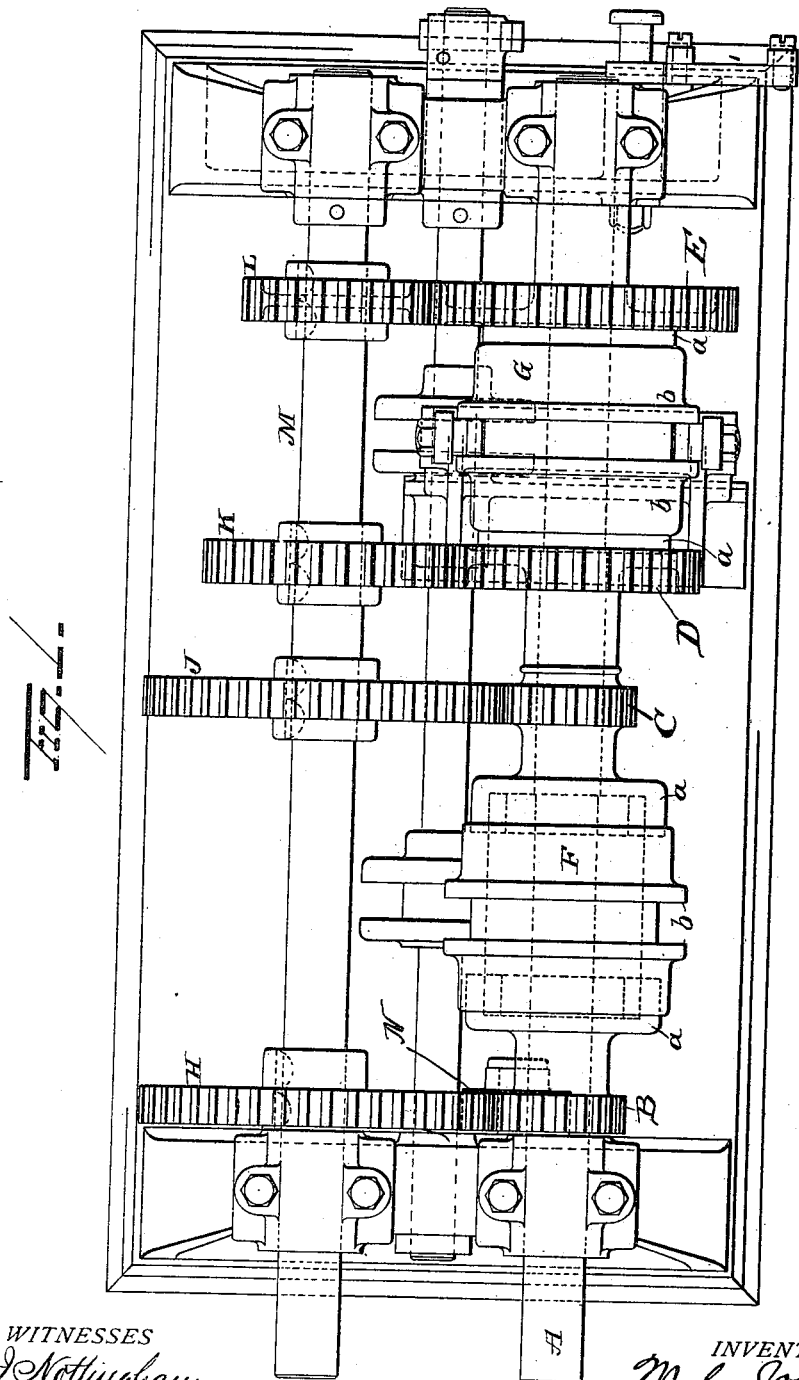

UNITED STATES PATENT OFFICE.

MOSES C. JOHNSON, OF HARTFORD, CONNECTICUT, ASSIGNOR TO THE HELIX GEAR COMPANY, OF SAME PLACE.

VARIABLE-SPEED GEARING.

SPECIFICATION forming part of Letters Patent No. 663,442, dated December 11, 1900.

Application filed June 4, 1900. Serial No. 19,038. (No model.)

*To all whom it may concern:*

Be it known that I, MOSES C. JOHNSON, of Hartford, in the county of Hartford and State of Connecticut, have invented certain new and useful Improvements in Variable-Speed Gearing; and I do hereby declare the following to be a full, clear, and exact description of the invention, such as will enable others skilled in the art to which it appertains to make and use the same.

My invention relates to an improvement in variable-speed gearing, and more particularly to means for changing the speed of a driven shaft without altering the speed of the motor or the driving-shaft.

As is well known, any motor will be most efficient when run at a speed determined at the time of its design and construction, and any material alteration of this speed, either higher or lower, will reduce both its efficiency and power. This is particularly noticeable in comparatively small motors, as this reduction is a larger proportion of the whole as the size and power of the motor are decreased. This is true regardless of the primary source of energy applied to motor.

In vehicles propelled by motors the usual method of controlling the speed of the vehicle is by varying the speed of the motor, causing a loss of efficiency and in most cases a loss of power as well.

It is one object of my present invention to obviate the losses above referred to and to so construct and arrange a variable-speed gearing that the speed of the driven shaft can be readily changed without affecting the speed of the motor and without undue wear and strain on the various parts of the structure.

A further object is to so construct the gearing that it can be controlled by means of a single lever to change the speed, step by step, of the driven shaft and to reverse the rotation of said shaft without changing either the speed of the motor or the direction in which it may be running.

With these objects in view the invention consists in certain novel features of construction and combinations and arrangements of parts, as hereinafter set forth, and pointed out in the claims.

In the accompanying drawings, Figure 1 is a plan view of gearing embodying my invention. Fig. 2 is a side elevation. Fig. 3 is an end view with parts removed. Fig. 4 is a detail view of one of the cams.

The appliances by means of which the objects of my invention are carried into effect comprise two shafts, on one of which is mounted rigidly a series of gears of varying diameters and on the other shaft, which is the driver of the pair, is mounted a second series of gears, which mesh with those on the first or driven shaft, those on the driving-shaft revolving freely thereon, but so arranged and constructed that any one of them may be locked to the shaft. As these gears may have any diameter relatively to each other, it follows that the ratio of speed of the two shafts may be varied in as many steps as there are pairs of gears, and by the introduction of an intermediate gear the direction of rotation of the driven shaft may be reversed without necessitating a reversal of the driving-shaft, and consequently of the motor. It is obvious that this change of speed can be varied almost indefinitely in either direction by a simple multiplication of the elements.

In the drawings I show three forward speeds and one backing or reversing speed, which is all that is necessary to fully describe the device and probably all that would ordinarily be used in practice.

The framework and base may be of any preferred form of construction to adapt the apparatus to the use and location in which it may be desired to employ it.

With respect to the operating parts the device consists of the shaft A, which is revolved from the motor by any suitable method, and which with the motor runs at a constant speed, this speed being that at which the motor is most efficient. On this shaft are mounted the gears B C D E, each carrying portions *a* of a clutch, which is preferably a friction-clutch. The gears B C D E are free to revolve on shaft A. Between gears B C and between gears D E the remainder *b* of the clutches are attached to the shaft A. The clutch mechanism is operated by the sliding sleeves F and G. I have not shown in the drawings all the details of the clutches, as any form of friction-clutches may be employed; but for the construction which I prefer reference may be had to that specifically set forth in Letters Patent granted to me May 20, 1884, and designated by No. 278,979. The gears C D E mesh directly with gears J K L, rigidly attached to the shaft M. The gear B meshes with an intermediate gear N, which in turn meshes with a gear H, also rigidly attached to shaft M. The gears C D E would cause a rotation of the shaft M in one direction at a speed proportional to the ratio of the gears of the one clutched to shaft A. The gear B through the intermediate N will cause a rotation in the reverse direction of shaft M of clutch to shaft A, which speed would also be proportional to the ratio between gears B and H. The sliding sleeves F G are moved longitudinally through the intervention of the blocks O by the levers P P', which are pivotally supported at Q Q'. The lower arms of these levers are provided with rollers c, which run in the grooves of cylindrical cams R R', fixed to a shaft S. The operating-grooves of these cams are formed in such a manner that the partial rotation of the shaft S, and consequently of the cams, will, through levers P P' and blocks O O, move sliding sleeves F and G in such order that the clutches will consecutively lock the gear, going from the fastest to the intermediate and from that to the slowest speed forward, and the continued revolution of cam will clutch in the reversing-gear. Between the unclutching of one speed and the clutching in of the next there is a period when both are free, and by this construction it will be seen that the speed must be increased or decreased by predetermined increments and cannot be changed abruptly from a high to a low speed, or vice versa, nor can the reversing-gear be thrown in except from the slowest forward speed, thus reducing the danger of undue strains or breakage to a minimum.

The necessary rotation of shaft S may, as shown in the drawing, be caused by the toothed sectors 1 and 2, which are introduced merely to reduce the range of motion of the operating-lever 3 and bring it at the same time to a convenient position.

The operating lever or handle is located in any suitable or desired position if the device is attached to a motor-vehicle, making the connection between the handle or lever and shaft S of any description made necessary by the conditions obtaining.

As hereinbefore stated, the shaft A receives its motion from the motor, and shaft M is connected to the driving mechanism of vehicle or other apparatus or machinery to be driven.

Having fully described my invention, what I claim as new, and desire to secure by Letters Patent, is—

1. In a variable-speed gearing, the combination with a driving-shaft, a series of gears of varying sizes loose thereon, a driven shaft, and a series of gears of varying sizes secured thereto and meshing with the gears on the driving-shaft, of clutches disposed between the pairs of gears on the driving-shaft, a lever connected with each clutch, a single clutch-operating shaft, a series of cams secured to said shaft and connected respectively with the levers, said cams so constructed and arranged as to lock one after another of the gears on the driving-shaft to said shaft when the clutch-operating shaft is turned in one direction and to unlock said gears in reverse order when said shaft is rotated in the reverse direction.

2. In a variable-speed gearing, the combination with a driving and a driven shaft, a series of gears secured to the driven shaft, a series of gears loose on the driving-shaft and meshing with the first-mentioned gears, and a clutch between each pair of loose gears, of a lever connected with each clutch, a cam for operating each lever, a shaft to which all of said cams are secured for operating the cams simultaneously to lock the gears on the driving-shaft to and unlock them from said shaft successively to gradually increase or diminish the speed of the driven shaft.

3. The combination with a driving and a driven shaft, gears of varying sizes loose on the driving-shaft, gears of varying sizes fixed to the driven shaft and meshing with the first-mentioned gears, and clutches between each pair of loose gears, of an intermediate gear meshing with a low-speed gear on the driven shaft and a gear on the driving-shaft, a lever connected with each clutch, an operating-shaft, a series of cams secured to said shaft for operating the clutch-levers, said cams constructed and arranged to throw the clutch-levers to successively lock the gears on the driving-shaft to said shaft and one of said cams constructed to cause the said low-speed gear to be locked to the driving-shaft and effect a reversal of rotation of the driven shaft through the medium of the intermediate gear.

4. In a variable-speed gearing, the combination with a driving-shaft and a driven shaft, gearing connecting said shafts, one set of gears loose and the other set fixed, of clutches between the pairs of gears of the loose set of gears, a lever connected with each clutch, a cam for operating each lever, a shaft to which all of said cams are secured for operating the levers simultaneously to lock the loose gears successively to increase or diminish the speed of the driven shaft.

In testimony whereof I have signed this specification in the presence of two subscribing witnesses.

MOSES C. JOHNSON.

Witnesses:
JOHN H. BUCK,
EDWARD M. DAY.